United States Patent [19]

Artom

[11] 4,387,271
[45] Jun. 7, 1983

[54] COMBINED TELEPHONE AND DATA-TRANSFER SYSTEM

[75] Inventor: Auro Artom, Turin, Italy

[73] Assignee: CSELT Centro Studi e Laboratori Telecomunicazioni S.p.A., Turin, Italy

[21] Appl. No.: 207,984

[22] Filed: Nov. 18, 1980

[30] Foreign Application Priority Data

Nov. 19, 1979 [IT] Italy ............................... 69232 A/79

[51] Int. Cl.³ .................. H04M 11/00; H04M 15/00; H04N 7/14
[52] U.S. Cl. .............................. 179/2 DP; 179/7.1 R; 358/85
[58] Field of Search .................. 179/2 DP, 2 R, 7.1 R, 179/7.1 TP; 358/85, 142; 370/41, 42, 43, 45, 69.1

[56] References Cited

U.S. PATENT DOCUMENTS 3,937,889  2/1976  Bell et al. .......................... 179/2 DP

FOREIGN PATENT DOCUMENTS 1806441  7/1970  Fed. Rep. of Germany ........ 358/85

OTHER PUBLICATIONS

8081 Proceedings of the National Electronics Conference, vol. 33, Oct. 29-31, 1979, pp. 488-494.
International PCT Application WO 80/00757 (Kirschner et al.), Published Apr. 17, 1980.
"A Design for a Small Viewdata Center Based on Distributed Control", by Coakley et al., International Conference on Private Electronic Switching Systems, London, Apr. 1978, pp. 85-89.
"Introducing the Captain System," by T. Tomita, Proceedings of the Pacific Telecommunications Conference, Honolulu, Jan. 1979, pp. 4A/15-23.
"Captain System," by T. Kumamoto and T. Kitamura, Japan Telecommunications Review, Jul. 1980, pp. 215-222.
"A Digital Transmission System for Multi-Terminal Applications," by Clothier and Bylanski, GEC Telecommunications Journal 41, 1980, pp. 10-16.

Primary Examiner—Thomas W. Brown
Attorney, Agent, or Firm—Karl F. Ross

[57]  ABSTRACT

Telephone lines extending between a central office and associated subscriber stations are provided at opposite ends with mutually complementary modems and with couplers by which code signals from subscriber-operated address selectors can be sent to a common data network containing specialized information or to associated data-retrieval units. The latter are connected in parallel to a bus originating at a data bank from which data bits grouped into pages are continuously emitted at high speed. Each retrieval unit comprises two shift registers, one of them being loadable from the bus by the incoming high-speed bits to store a complete page together with an accompanying address code while the other receives a selected address code from the associated subscriber. A comparator, upon detecting an identity between the coded addresses stored in the two registers, stops the loading of the first shift register and commands its readout over the subscriber line at a slow rate compatible with that line's bandwidth. At the subscriber station the incoming data are displayed on a viewer of a data terminal or, with the aid of an adapter, on a television receiver. The transmission of address codes and other data over any subscriber line occurs between the two modems thereof at frequencies outside the voice band.

7 Claims, 2 Drawing Figures

COMBINED TELEPHONE AND DATA-TRANSFER SYSTEM

Field of the Invention

My present invention relates to a telephone system adapted for the dissemination of data to subscribers from a centralized location.

Several systems are known which enable the transmission of data to a multiplicity of subscriber stations equipped with television receivers or data terminals adapted to display alpha-numerical symbols or graphics; the information displayed may include news of the day, stock-market reports, sports results or the like. Some of these systems, such as the one known as Teletext, use radio-frequency broadcasting for this purpose; others, e.g. that known as Viewdata or Prestel, utilize telephone lines switched from their normal use to data transmission.

The use of telephone lines instead of radio waves for data dissemination offers the advantage that the company supplying the data can refuse requests from callers that have not paid in advance for the service; still, the facilities could be overloaded by telephone subscribers demanding access to a data bank without being entitled thereto. In any event, a subscriber connected to such a data bank can neither initiate nor receive a telephone call while communicating therewith.

OBJECTS OF THE INVENTION

The general object of my present invention, therefore, is to provide a combined telephone and data-transfer system allowing a subscriber to communicate with a data bank and/or a specialized data network without preventing the normal use of a telephone line over which such communication takes place.

A more particular object is to provide means in such a system for enabling an automatic determination of charges for access to a data bank, in amounts depending on the kind of data requested.

SUMMARY OF THE INVENTION

In accordance with my present invention I provide, in a telephone system wherein a multiplicity of subscriber stations communicate with a central office via respective local lines, a generator of data bits continuously emitted at a location remote from the subscriber station over a bus to all the local lines at a high speed exceeding the transmission capacity of these lines, the data bits being divided into groups which are each preceded or otherwise accompanied by an address code assigned thereto and which will be referred to hereinafter as pages since they are generally intended to appear like a printed page on the screen of a television receiver or similar viewer. The bus is connected to each local line at the aforementioned remote location by way of a respective retrieval unit including register means for temporarily storing the bits of any page and reading same out over the associated local line, in response to a request signal from the respective subscriber station identifying such page, at a reduced speed compatible with the transmission capacity of the line; at the subscriber station the received information is visualized by display means of the type referred to above.

Pursuant to a more particular feature of my invention, the register means of each retrieval unit comprises a first shift register, accommodating all the bits of any page including the address code assigned thereto, and a second shift register, connected to an incoming branch of the associated local line for receiving an address code selected by the respective subscriber. A comparator with inputs connected to the two shift registers generates a switching signal upon detecting an identity between address codes respectively stored therein; the switching signal, via circuit means responsive thereto, disconnects a loading input of the first shift register from the data bus normally connected thereto and connects a slow local clock to a stepping input of this shift register while extending an output thereof to an outgoing branch of the local line.

Advantageously, in accordance with another feature of my invention, each retrieval unit further includes charge-determining means connected to the first shift register and activated by the switching signal from the comparator for indicating to the central office an amount to be billed to the respective subscriber, that amount being dependent on the nature of the retrieved data as indicated by the address code stored in this shift register upon the occurrence of the switching signal.

According to a further feature of my invention, each subscriber station participating in the data-dissemination program includes an address selector for generating the aforementioned request signal. This address selector is connected together with the associated display means to the corresponding local line via a first modem and first coupling means, the latter being also connected to the subscriber's telephone set so as to make the line available for telephone calls as well as data communication. At the other end of the local line I provide second coupling means connected on the one hand to the central office and on the other hand, by way of a second modem, to the respective retrieval unit. The two mutually complementary modems serve to convert digitized request signals from the address selector and stored data bits read out from the retrieval unit into signaling frequencies to be transmitted over the local line while reconverting received signaling frequencies into digital form, these signaling frequencies preferably lying outside a voice band concurrently transmissible over the local line between the telephone set and the central office.

In addition, or alternatively, the modems may be used for communication between a subscriber's data terminal and a specialized data network accessible by all the local lines via their second coupling means, again with possible concurrent transmission of voice signals over the same lines.

BRIEF DESCRIPTION OF THE DRAWING

The above and other features of my invention will now be described in detail with reference to the accompanying drawing in which.

SPECIFIC DESCRIPTION

Figure 1:
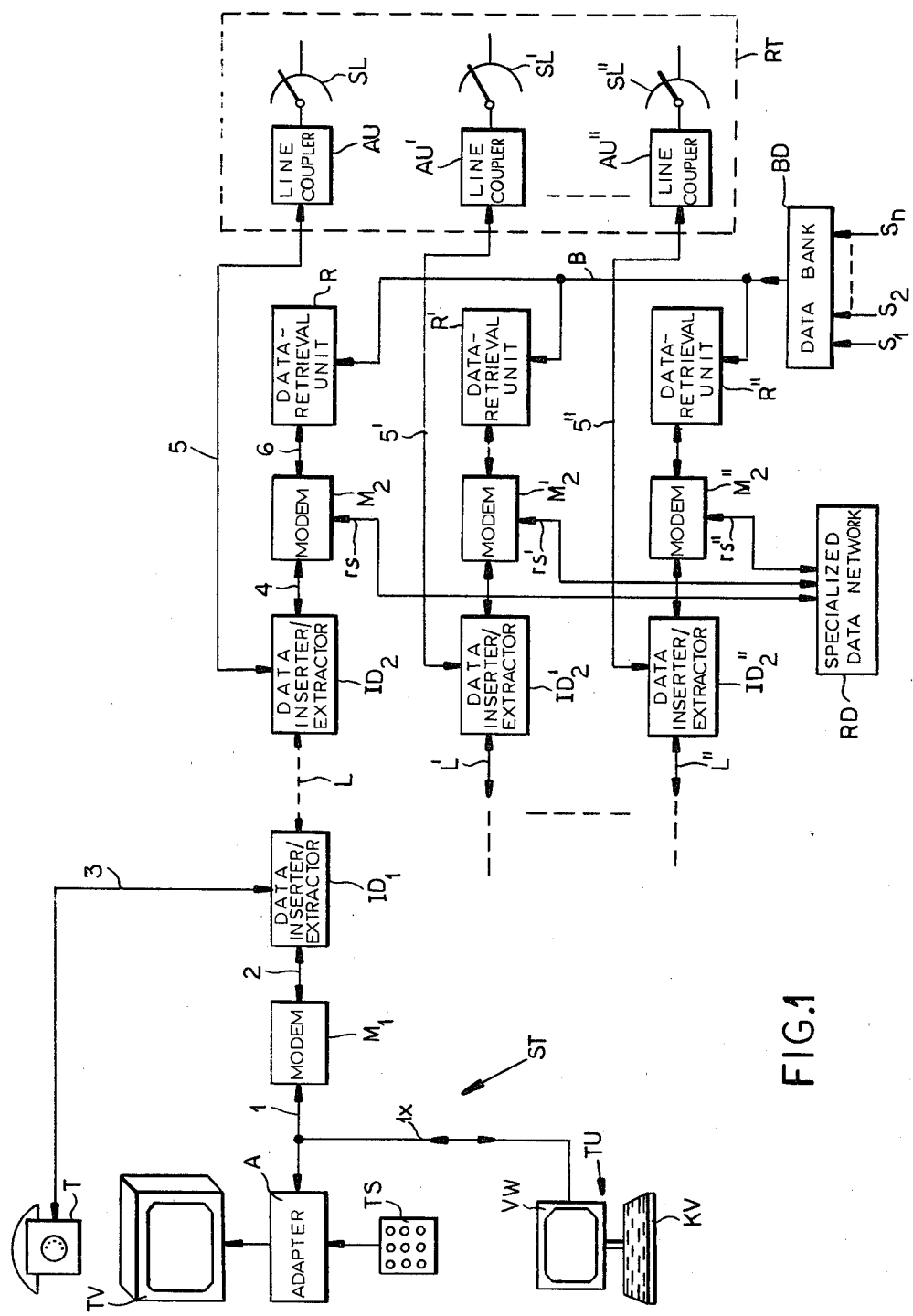
FIG. 1 is an overall block diagram of a combined telephone and data-transfer system according to my invention.

In FIG. 1 I have shown at left a subscriber station ST provided with a telephone set T, a television receiver TV and a data terminal TU. Station ST is connected to a central office RT via a local line L comprising a conventional two-wire loop having a bandwidth whose upper limit lies above 8 kHz. Other subscriber stations of the system, not shown, are connected to the central office via similar lines L' and L". The illustrated station ST is linked with line L through a coupling circuit $ID_1$ acting as a data inserter/extractor. This circuit, which may be of a type conventionally used in cable television, is tied by a two-way connection 3 to telephone set T and by another such connection 2 to a modem $M_1$ from which a two-way link 1 extends to an adapter A; a branch 1x of link 1 connects the modem $M_1$ to the data terminal TU which is shown to comprise a viewer VW together with a keyboard KV. Adapter A works into television receiver TV and passes digitized address codes from a pushbutton selector TS to modem $M_1$; such address codes can also be generated by keyboard KV.

A similar coupling network $ID_2$, also serving as a data inserter/extractor, links the remote end of line L via a two-way connection 4 to a modem $M_2$ complementary to modem $M_1$ and through a similar connection 5 to a line coupler AU in central office RT. Line coupler AU forms part of the conventional central-office equipment of which only two other line couplers AU' and AU", respectively assigned to subscriber lines L' and L", and associated first selector stages SL, SL' and SL" have been illustrated. Modem $M_2$ is connected through a two-way link 6 to a data-retrieval unit R, more fully described hereinafter with reference to FIG. 2, which receives a continuous bit stream via a bus B (e.g. a coaxial or fiber-optical cable) from a data bank BD. The latter is shown to have inputs connected to a variety of sources $S_1, S_2 \ldots S_n$ from which different kinds of information are received and converted into pages whose bits are successively transmitted over bus B at a high speed of, say, 140 Mbits/sec. Bank BD is assumed to have a storage capacity of about 450,000 pages each consisting of 24 rows and 40 characters in the form of 7-bit words per row; thus, a page containing 6720 bits can be sent out on bus B during a period of about 20 milliseconds.

FIG. 1 further shows a specialized data network RD containing information which may be accessible to subscribers who may have prepaid the fee for this service or may be billed separately therefor. Network RD is linked with modem $M_2$ through a two-way connection rs over which such information may be transmitted in the form of data packets, for example, in response to a request from the subscriber generated by pushbutton selector TS or keyboard KV. The keyboard could also be used for the transmission of inquiries or outgoing information from the subscriber to destinations reached with the aid of corresponding address codes via network RD.

Subscriber lines L' and L", which of course are representative of a large number of such lines, terminate at respective data inserters/extractors $ID_2'$ and $ID_2''$ linked by two-way connections 5' and 5" to the corresponding line couplers AU' and AU". Circuits $ID_2'$ and $ID_2''$ are further linked with respective modems $M_2'$ and $M_2''$ which are connected to bus B by way of retrieval units R', R" and to network RD through links rs', rs".

Modems $M_1$ and $M_2$ are conventional modulating-/demodulating units adapted to convert binary signals into phase or frequency shifts of carrier waves outside the voice band, different for transmission from and to station ST, and to reconvert these carrier waves into their original binary form. In the present instance it is assumed that the modems are capable of operating in full-duplex fashion at 8 kbits/sec. Coupling circuits $ID_1$ and $ID_2$ discriminate between voice frequencies and carrier frequencies received over line L, routing the former to connection 3 or 5 and the latter to the associated modem via connection 2 or 4. Adapter A is also of a type well known per se, e.g. from the aforementioned Viewdata system, and comprises a memory capable of storing all the bits of a page received from modem $M_1$. The stored bits then modulate the beam of television receiver TV as the memory is repeatedly scanned in conformity with the line and frame sweeps of that receiver to project the bit pattern of the selected page during each frame period onto the television screen until the subscriber turns off the receiver. Adapter A also transmits address codes from pushbutton selector TS via link 1 to modem $M_1$.

Figure 2:
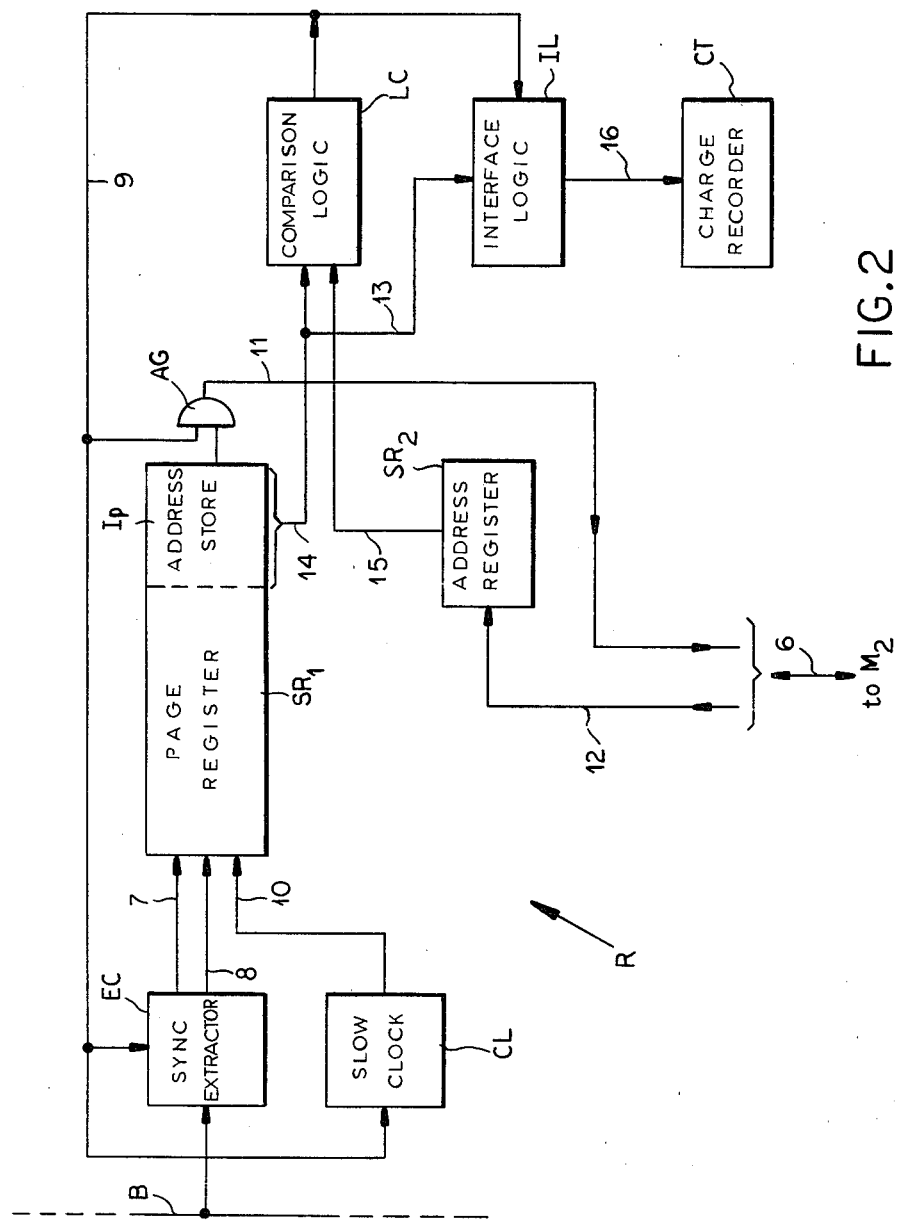
FIG. 2 is a more detailed diagram of a retrieval unit forming part of the system of FIG. 1.

As shown in FIG. 2, retrieval unit R comprises two shift registers $SR_1$ and $SR_2$. Register $SR_1$ has a loading input 7 connected to bus B by way of a sync extractor EC which detects the rhythm of the incoming bit stream and, via a lead 8, steps the register to store the incoming data bits at their arrival rate of 140 Mbits/sec. A section Ip of register $SR_1$ contains the accompanying address code, identifying the originating source $S_1-S_n$ (FIG. 1), whenever the bits of a complete page are stored therein. An AND gate AG in an output lead 11 of this register, which forms an outgoing branch of connection 6, normally blocks the readout of the oldest stored bits displaced by new arrivals serially fed in. Shift register $SR_2$ is of substantially smaller capacity and has a loading input connected to an incoming branch 12 of connection 6 from which it receives the bits of a selected address code as reconstituted by modem $M_2$. Output multiples 14 and 15, respectively extending from address store Ip and from register $SR_2$, terminate at a logic network LC serving as a code comparator; when the two codes in its input connections 14 and 15 are identical, comparator LC emits a switching signal on a lead 9 which extends to sync extractor EC, to a local clock CL, to another input of gate AG and to an interface logic IL connected to a branch 13 of multiple 14. This switching signal inhibits the sync extractor EC and blocks the loading of register $SR_1$ via lead 7 but activates the clock CL to energize another stepping input 10 of the register with pulses of low cadence, namely 8 kHz in the present instance, to read out the contents of register $SR_1$ through the unblocked gate AG onto lead 11. Logic network LC includes a timer, such as a pulse counter stepped by clock CL, which maintains the energization of lead 9 until the stored page has been completely read out. If the same address remains stored in register $SR_2$, the procedure is repeated when the corresponding code reappears in register section Ip; the bits then read out from register $SR_1$, which may contain updated information, replace those previously stored in the memory of adapter A or in a corresponding memory of terminal TU. Interface logic IL, when activated by the switching signal on lead 9, determines from the stored address code the nature of the information requested by the subscriber and informs a charge recorder CT (which could be included in central office RT of FIG. 1) of the amount to be billed to the subscriber for the information communicated.

If the address code generated by selector TS of keyboard KV is of a particular nature designating the data network RD rather than an item of information available from data bank BD, modem $M_2$ switches that code to lead rs whereupon network RD responds with an emission of data bits which may also have the format of a page adapted to be displayed on television receiver TV or on viewer VW. Similar address codes could be used to prepare the network for receiving information sent out by the subscriber, by means of keyboard KV, and for routing that information to its designated destination.

I claim:

1. In a telephone system wherein a multiplicity of subscriber stations communicate with a central office via respective local lines, the combination therewith of:

a generator of data bits continuously emitted at a location remote from said subscriber stations over a bus common to all said local lines at a high speed exceeding the transmission capacity of said local lines, said data bits being divided into groups each accompanied by an assigned address code;

a multiplicity of retrieval units each connected at said remote location between said bus and a respective local line, each retrieval unit including register means for temporarily storing the bits of any of said groups and reading same out over the associated local line, in response to a request signal from the respective subscriber station identifying such group, at a reduced speed compatible with the transmission capacity of the associated local line; and display means at each subscriber station connectable to the local line thereof for visualizing the data groups received from the associated retrieval unit.

2. The combination defined in claim 1 wherein said register means comprises a first shift register accommodating all the bits of any data group including the assigned address code, said first shift register having a loading input normally connected to said bus, each retrieval unit further comprising a second shift register connected to an incoming branch of the associated local line for receiving an address code selected by the respective subscriber, comparison means with inputs connected to both said shift registers for generating a switching signal upon detecting an identity between two address codes respectively stored therein, and circuit means responsive to said switching signal for disconnecting said loading input from said bus and connecting a slow local clock to a stepping input of said first shift register while extending an output thereof to an outgoing branch of the associated local line.

3. The combination defined in claim 2 wherein each retrieval unit further includes charge-determining means connected to said first shift register and activable by said switching signal for indicating to said central office an amount dependent on the nature of the retrieved data to be billed to the respective subscriber.

4. The combination defined in claim 1, 2 or 3 wherein each subscriber station includes, in addition to a telephone set, an address selector for generating said request signal, said address selector being connected together with said display means to the corresponding local line via a first modem and first coupling means also connected to said telephone set, each retrieval unit being connected to the respective local line via a second modem and second coupling means also connected to said central office.

5. The combination defined in claim 4 wherein said second modem also has access to a specialized data network common to all said local lines, said address selector being operable to emit code signals recognizable by said second modem as a request for connection to said data network.

6. The combination defined in claim 4 wherein said first and second modems are respectively adapted to convert digitized request signals from said address selector and stored data bits read out from the associated retrieval unit into signaling frequencies transmitted over the local line while reconverting received signaling frequencies into digitized form, said signaling frequencies lying outside a voice band concurrently transmissible over the local line between said telephone set and said central office.

7. The combination defined in claim 4 wherein said display means comprises a television receiver with a screen capable of visualizing the information conveyed by all the bits of a data group during one frame period, said television receiver and said address selector being connected to said first modem through an adapter capable of converting incoming bits of a data group into beam-modulating signals for said television receiver.

* * * * *